(12) United States Patent
Chapman

(10) Patent No.: US 11,484,011 B2
(45) Date of Patent: Nov. 1, 2022

(54) PET COLLAR HAVING PENDANT WITH INTERCHANGEABLE CRYSTAL

(71) Applicant: Susan Marie Chapman, Miami Beach, FL (US)

(72) Inventor: Susan Marie Chapman, Miami Beach, FL (US)

( * ) Notice: Subject to any disclaimer, the term of this patent is extended or adjusted under 35 U.S.C. 154(b) by 0 days.

(21) Appl. No.: 16/895,160

(22) Filed: Jun. 8, 2020

(65) Prior Publication Data

US 2021/0378214 A1    Dec. 9, 2021

(51) Int. Cl.
*A01K 27/00*    (2006.01)

(52) U.S. Cl.
CPC .......... *A01K 27/001* (2013.01); *A01K 27/006* (2013.01)

(58) Field of Classification Search
CPC .. A01K 27/001; A01K 27/006; A01K 27/002; A01K 27/003; A44C 25/00; A44C 25/001; A44C 25/002

See application file for complete search history.

(56) References Cited

U.S. PATENT DOCUMENTS

| | | | | |
|---|---|---|---|---|
| 5,632,164 A | * | 5/1997 | Bergagnini | A44C 17/04 63/23 |
| 2005/0081799 A1 | * | 4/2005 | Huntley, III | A01K 27/001 119/858 |
| 2010/0277943 A1 | * | 11/2010 | Hurwitz | A01K 27/006 362/555 |
| 2012/0206906 A1 | * | 8/2012 | Gindi | A01K 27/006 362/103 |
| 2013/0247613 A1 | * | 9/2013 | Christodoulou | A44C 17/0225 63/23 |
| 2013/0276479 A1 | * | 10/2013 | Noyes | A44C 17/0283 63/28 |
| 2016/0071440 A1 | * | 3/2016 | Hibbert | B23K 26/38 40/124.01 |
| 2017/0172265 A1 | * | 6/2017 | Leuz | A44C 25/002 |
| 2018/0307050 A1 | * | 10/2018 | Dholakiya | G02B 27/0006 |
| 2020/0268117 A1 | * | 8/2020 | Hipp | A44C 15/0075 |
| 2021/0307462 A1 | * | 10/2021 | Dailey | A61B 5/024 |

FOREIGN PATENT DOCUMENTS

GB    458518 A  * 12/1936  ........... A01K 27/006

* cited by examiner

*Primary Examiner* — Kristen C Hayes
(74) *Attorney, Agent, or Firm* — Brennan, Manna & Diamond, LLC

(57) ABSTRACT

The present invention relates generally to a unique pet accessory capable of holding a pendant with a crystal or precious gemstone inside. The pendants are interchangeable with different crystals. The collar of the present invention provides a unique way to accept the pendant. The pendant with the crystal can be open ended on each side so that it is in contact with the pet. The crystal creates a balance of positive energy between the pet and the owner, and between the crystal and the pet.

15 Claims, 2 Drawing Sheets

PET COLLAR HAVING PENDANT WITH INTERCHANGEABLE CRYSTAL

BACKGROUND

The present invention relates generally to the field of pet products and, particularly, to pet collars such as accessorized dog collars, bands, harnesses or other elements which may be configured to fit around an area of an animal, e.g. neck, paw, torso, or the like. Even more particularly, to a unique dog life collar or band capable of holding a pendant or ornament with a crystal, stone, semi-precious or precious gemstone inside. In addition, the pendant may have additional reflective, tracking or other safety or aesthetic related attributes. Accordingly, the present specification makes specific reference to an improved pet accessory. However, it is to be appreciated that aspects of the present invention are also equally amenable to other applications, devices and methods of manufacture.

Many people around the world are pet owners, and many prefer a dog as a pet. These owners consider the dog as a part of their family, and want to keep the dog happy, safe and comfortable. There are a lot of pet products like essential items and other accessories. While a few of these types of accessories are simply for style, most of them are essential for keeping a pet comfortable in the elements. Many pet owners are constantly looking for items that will give their pet more aesthetic appeal in the hopes of making their companion the most fashion forward and accessorized amongst all other pets.

A pet collar or band is typically a piece of material positioned around a portion of an animal, and may include the neck, paw, torso, or tail. The collar or band may be used for restraint, identification, fashion, assistance and/or protection. For example, a harness may be used and encircle different portions of the animal, and can be used to assist a handicap owner. Identification tags and medical information are often placed on the dog collars, such as by the use of tags that are attached to the collar by a fastener, hook or similar means of engagement. The collars are often used in conjunction with a leash for walking or restraining a dog. Further, the collar is a dog accessory that has and will continue to exist and remain popular for many centuries to come. There has been an evolution in the field of dog accessories, and the collar for a dog has developed from a mere control accessory to a device which can be used in correcting dog behaviors and even for communicating with them. With the dog collars and leashes, the dog owners are more confident while walking or being out with their dogs without any fear of the pet running away.

Collars can be made from a variety of materials, most preferably using faux leather, natural or synthetic fabrics or nylon webbing. Less common choices of materials can include polyester, hemp, metal, fabric or "oilcloth" (vinyl woven with cotton). Collars can be decorated in a variety of ways with a variety of materials which are commonly embedded in the collar such as with studs, adhered to or stitched into the collar itself. In the state of the art, traditional dog collars include: buckle collars, break-away collars, choker or chain slip collars, head collars (also similar to muzzle collars) and safety stretch collars.

Aside from the material design, collars come in a variety of different options. Some collars come with straps and some come with buckles, which makes the collar adjustable. When choosing the right dog collar, it is important to measure the girth and size of the dog's neck and choose an adjustable collar for comfort. The dog owner should also know the different collar materials available, and if the dog will have a potential allergic reaction to the same. As already discussed, dog collars are traditionally made from nylon, leather, natural or synthetic materials or metal. Some nylon and leather collars may include some plastic elements, but nylon and leather collars are easier to maintain than metal collars. Metal collars will eventually corrode, discolor and rust, rendering them useless after a period of time, particularly if there are routinely exposed to the elements. The dog owner can easily wash nylon or fabric collar and dry them in a short period of time, and many of these collars have water-proof or other useful features, which is a desirable for a pet owner.

Various designer dog collars are available in the marketplace today and cover a wide expanse of pricing options. Mostly dog owners prefer to have decorative and designer collars containing decorative stones on the strap, for their dogs. However, in conventional decorative dog collars, stones are fixed and are not typically replaceable, so the ornamentation rapidly soils and deteriorates, losing attractiveness, even though the dog collar remains functionally satisfactory. Another problem with many decorative dog collars is that it is necessary to purchase a completely new dog collar when the color or design decorative stone becomes aesthetically unattractive or out of style, lost, broken or when the owner of the dog desires to change to a collar of a different aesthetic appearance. Further, the dog collars with stones intact are merely for aesthetic means and do not serve any other purpose, such as drawing positive energies, etc. In addition, decorative stones which are affixed to collars can be an irritation to the animal when the animal scratches as the stones can scrape the leg of the dog. Likewise, decorative stones can catch on the owner's clothing or scratch the owner when trying to grasp or control the dog.

Some dogs have specific issues which means they require certain accessories. For example, dogs that are suffering from some health or mental problem require something to console, comfort and touch them in a way that positivity can be maintained, such as by using crystals and gemstones in a form of pendant or ornament. Crystals are believed to be the elixir from Mother Nature. Crystal elixirs are also known as crystal essences, gem waters, gem tonics and similar nomenclature. Such elixirs can be generated by different methods, but normally, exposing the gemstone to water will so that the vibrations or emissions of the gemstones are absorbed by the water. Another method of making an elixir is to simply place a crystal into a container filled with water and leaving it exposed to sunlight or moonlight for a few hours. Alternatively, the crystal does not make direct contact with the water and can be made by indirect immersion. This means the crystal is placed on a piece of clear quartz or glass which is then placed in direct contact with the water. The vibrations are absorbed through the quartz or glass. This is the safest way to make elixirs as crystals often contain heavy metals and dyes that can leach into the water if the intent was to consume the water-based solution.

When used appropriately, a crystal that bonds with the dog can nurture them unlike any training, toy or treat. Some crystals have specific abilities for healing a pet. For instance, there are specific crystals that seem to resonate better to restore health to certain organs or disease conditions in a dog or a human. Carnelian, or cornelian, is a brownish-red or red-orange and occasionally pink mineral and also known as an "artist's stone", for instance works very well with various skin conditions. Amethyst, which has a purple like color, works well for headache and arthritic conditions as well as thyroid disorders. Crystals such as Rose Quartz even work well to work on emotional states for love and happiness. Some crystals, such as Selenite, which is typically white in color and is also known as "moonstone," are also used as bridges to higher consciousness. Other crystals that may be used include aquamarine and garnet depending on the particular properties sought by the pet owner in harmonizing with his or her pet. Animals appreciate the psycho-spiritual aspects as much as humans. Therefore, there is a need for a unique collar which supports pendant or ornament with such kind of crystals or gemstones and either allow for continuous physical contact or for the pet to receive the vibrations between the dog and the crystal to activate chakras or areas of spiritual or physical energy in the body.

Currently, to use stones, gemstones and crystals for a pet, owner performs various tasks that are tedious and less efficient. Owners place stones or crystals under pet's bed for a certain time period such up to two weeks. In some cases, owners hold the crystal or stone in their hand and stand a few inches away from the affected area of the pet to heal the affected area. Owners put the stone or crystal such as a piece of Rose Quartz or Amethyst in pet's water bowl or bucket such that the crystal leaves its energy imprint in the water and, when pet drinks it, the energy affects the pet positively. Owners also create a mandala or circle of stones or crystals around the pet. Further, there are designer dog collars which have stones intact in their collar portion for aesthetic purpose, and does not touch the dog's body. As discussed, all these ways of using crystal or stone or precious gemstone do not ensure that crystal or stone or precious gemstone always touches or connects with the pet, and force the owner to constantly check and monitor the crystal or stone or precious gemstone, and also can interfere with pet's movement.

Therefore, there exists a long felt need in the art for a novel pet collar or band capable of holding a pendant or ornament with a crystal or stone or precious gemstone inside. There is also a long felt need in the art for a pendent or ornament that has a stone or gemstone or crystal which is open ended on each side so that it either always touches the dog directly or physically or indirectly such that vibrations or other emissions from the stone and impact the emotional well-being of the pet so that the pet is always taken care of There is also a long felt need in the art for the pendants or ornaments to be interchangeable with different crystals inside each pendant to soothe and heal the pet with appropriate positive energy. Finally, there is a long felt need for a novel pet collar or band capable of holding a pendant or ornament with a crystal or stone or precious gemstone inside that creates a balance of positive energy between the dog and the owner, and between the crystal and the dog.

The present invention, in one exemplary embodiment, is a unique pet collar, accessory or band capable of holding a pendant or ornament with a crystal or precious gemstone inside. The pendants are interchangeable with different crystals to obtain additional health or emotional benefits. The accessory of the present invention provides a unique way to accept the pendant or ornament. The pendant or ornament with the crystal can be open ended on each side so that it touches the dog. Alternatively, the pendant or ornament can be open only on one side with the open side facing the pet and the other side sealed so as to protect the gemstone from the elements or damage. The crystal creates a balance of positive energy between the dog and the owner, and between the crystal and the dog. It is known in the art, that specific types of crystal work on different chakras. An example would be a rose quartz which works on heart chakra causing powerful movement of energy.

In this manner, the improved pendant or ornament of the present invention accomplishes all of the forgoing objectives, thereby providing an easy solution to circulate positive energies in the pet. A primary feature of the present invention enables a user to interchange the crystal pendants or ornaments as desired, attach different pendants or ornaments to the collar or accessory as desired to promote positive energies and work on different aspects. Finally, the improved pendant of the present invention is capable of improving the behavioral traits in a pet and also maintain a healthy relation and understanding between pet and the owner.

In a further embodiment of the present invention, an accessory for a pet is provided and includes a segment of material (cloth, chain, metal, synthetic, etc.) generally deformable and conforming to fit around a portion of the pet and forming a collar, harness, wristband or combinations thereof. The accessory has a detachable element containing a gemstone or crystal, selected to provide a health benefit to the pet, the element being removable from the accessory, and the detachable element provides contact with the animal either directly or indirectly.

In a still further embodiment of the presently described invention, a dog collar is provided and includes having a dimension configured to fit around a neck of a dog, the collar has a fastening element to secure the collar to the dog. A detachable pendant is provided and has front and rear surfaces and at least partially encloses one of a crystal, stone or gemstone. The pendant has a shape corresponding to the shape of the crystal, stone or gemstone. The one of crystal, stone or gemstone is selected to correspond to a particular characteristic chosen by a user of the collar. The one of the crystal, stone or gemstone is held by the pendant so as to be in direct or indirect contact with the dog.

A further embodiment of the present invention, includes a method of treating a physical or emotional condition of a pet, and includes steps of initially providing a collar. The collar has a pendant or ornament removably detachable from the collar. Next, a crystal is selected for use in treating a physical or emotional condition of the pet. The crystal is inserted in the pendant and the pendant is connected to the collar. The collar is placed on the pet such that the crystal is in one of direct or indirect contact with the pet.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a unique pet accessory capable of holding a pendant or ornament with a crystal or precious gemstone inside. The pendants or ornaments are interchangeable with different crystals or gemstones. The collar or accessory of the present invention provides a unique way to accept the pendant or ornament. The pendant ornament with the crystal can be open ended on each side so that the pendant always touches body of the dog or open only on the side that faces the pet. The crystal or stone creates a balance of a positive energy between the pet and the pet owner, and between the crystal and the pet. It is known in the art, that specific types of crystal work on different chakras. An example would be a rose quartz which works on heart chakra causing powerful movement of energy in and around a pet wearing the gemstone. In the present invention, the crystal pendants are interchangeable as desired, and therefore, different crystal pendants or ornaments can be attached to the collar as desired to promote different positive energies.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
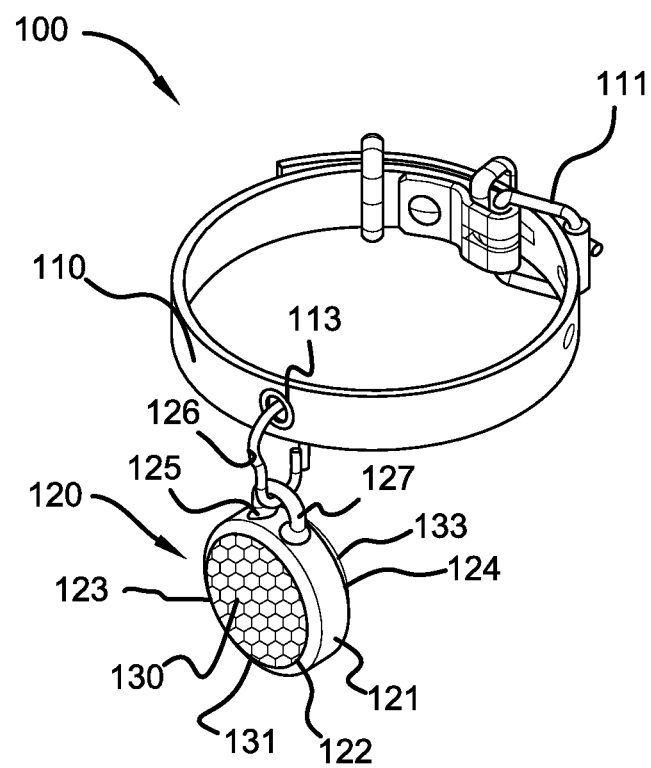
FIG. 1 illustrates a perspective view of one potential embodiment of the unique collar with a pendant containing a crystal of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention or do not limit the scope of the invention. Additionally, an illustrated embodiment need not have all the aspects or advantages shown. Thus, in other embodiments, any of the features described herein from different embodiments may be combined.

The present invention, in one exemplary embodiment, is a unique pet accessory such as a dog collar capable of holding a pendant with a crystal or precious gemstone inside. It should be understood that while in one embodiment reference is made to a collar, it should be understood that the invention may be used with other pet accessories and adaptations such as bands, wristbands, harnesses, or combinations thereof. In addition, while reference herein is commonly made to a dog, it should be understood that this invention may be used with both domesticated and undomesticated animals which may be pets, or other human companions. The term "pet" or "pets" does not only refer to mammals and may include amphibians, herptiles, avian and other animals which may provide companionship or other benefit to their owner.

The pendants or ornaments are interchangeable with different crystals. The collar or accessory of the present invention provides a unique way to accept the pendant. The pendant with the crystal can be open ended on each side so that it touches the dog. The crystal creates a balance of positive energy between the dog and the owner, and between the crystal and the dog. Specific types of crystals can work on different chakras. Therefore, the present invention allows a user to interchange crystal pendants as desired and attach different pendants to the collar or accessory in order to promote different desired positive energies.

Referring initially to the drawings, FIG. 1 illustrates a perspective view of one embodiment of a mindful dog life collar 100 of the present invention and comprising a unique collar 110 with a pendant 120 containing a crystal 130 in accordance with the disclosed architecture. More specifically, the collar 110 is a strap or band of material which is wrapped around a neck of a dog by utilizing a fastener 111, a support hole 113 which holds and support a pendant 120 through a hook 126. The pendant 120 comprises a pendant body 121, a pendant cavity 122 to hold a crystal or gemstone 130, a pendant front surface 123, a pendant rear surface 124, a bail or loop 127 integrally connected to the pendant body, a hook 126 and a few supporting components 125. The hook 126 connects the pendant bail 127 to the collar 110. The crystal 130 is contained inside the pendant cavity 122, with both surfaces open, i.e. a crystal front surface 131, a crystal rear surface 133.

In a preferred embodiment, the pendant 120 is adapted to be worn by pets such as a dog, a cat, and others, with the help of the collar 110. The pendant body 121 has a bail 127 on top of the pendant body 121 adapted for being attached to the collar 110 via a hook 126. The crystal 130 is embedded inside the pendant cavity 122 of the pendant body 121, wherein the crystal 130 is replaceable and open from both the crystal front surface 131 and the crystal rear surface 133 sides. In an alternate embodiment, the pendant may only be open on one of the front and rear surfaces, so that the open end faces the pet, and the other face is closed so as to protect the gemstone or crystal from damage.

The collar 110 has a collar fastener 111 positioned on terminal ends of the collar 110. The fasteners 111 can be of any type of operable fastening mechanism or device, for example, opposing snaps, chain closure fasteners, opposing Velcro® materials, buttons and button holes, rings and clips, buckle, opposing attractive magnets or any other fastening mechanism known in the art.

The collar 110 will be available in different sizes to accommodate different size pets. Likewise, if the accessory is a wristband, harness or some other product configuration then the accessory is sized and configured to fit the intended animal and/or its appendage. The collar 110 of the present invention may have additional adjusting elements to customize a size of the collar 110 to fit the neck of different sized pets, such as dogs, cats, etc. Exact size, measurement, construction and design specifications of the unique collar 110 of the present invention may vary upon manufacturing or the particular material that is used. The pendants 120 are interchangeable with different crystals or gemstones 130. The collar 110 is unique because it will be specially made to accept the pendant 120. Each collar 110 will have a place for the pendant 120 which is uniquely made for this specific collar 110 to attach to it. In an embodiment, the collar 110 may have multiple holes 113 at different positions, to accept different pendants 120 as per the requirements of the dog.

The pendant 120 may be manufactured using any suitable material, including common and precious or semiprecious metals such as sterling, copper, nickel, silver, gold, and platinum, as well as minerals, ceramics, crystal etc. According to an embodiment, individual segments such as pendant body 121, bail 127 and hook 126 of the pendant 120 are made from different materials, such as, for example, a combination of gold and silver segments.

In a preferred embodiment of the present invention, the collar 110 may comprise an identification tag which can be a manual tag or an electronic tag or the like that allows data, particularly personal information like name of the dog, owners information, health data and vet appointments, to accompany the dog. This provides ready identification of the pet, if the pet such as dog is lost, as the owner's name and phone number are also listed in the tag. The accessory 110 can also be provided with a radio frequency identification tag to allow tracking or identification of the pet, a QR code or the like which can also be used to provide information to someone scanning the code such as through the use of a smart phone.

Figure 2:
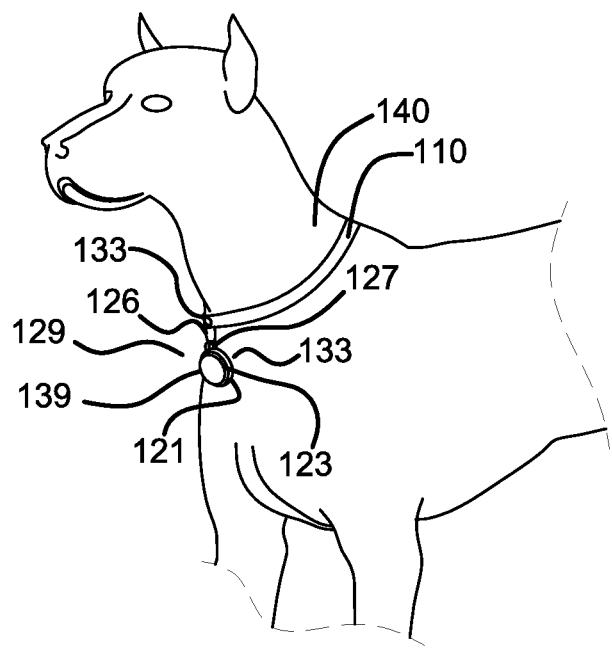
FIG. 2 illustrates a view of a pet wearing an embodiment of the unique collar of the present invention and illustrating a crystal rear surface touching a pet's body in accordance with the disclosed structure; and, FIG. 3(a) through (c) illustrate different embodiments of the pendant and associated crystals of the present invention in accordance with the disclosed structure.

FIG. 2 illustrates a view of a dog 140 wearing a unique collar 110 with a pendant 120 of the invention showing crystal rear surface 133 touching the dog's body in accordance with the disclosed architecture. More specifically, the collar 110 with the pendant 120 is worn and arranged in such a way that the crystal 130 of the pendant 120 always touches or faces the dog 140 through the crystal rear surface 133. In this way, the crystal 130 creates a balance of positive energy between the dog 140 and the owner, and between the crystal 130 and the dog 140.

In an embodiment, during the movement of the dog, if the pendant 120 rotates around the longitudinal axis of the pendant 120, the open ended structure of the pendant 120 will make sure that the crystal front surface 131 touches or faces the dog's body to continuously heal and work on the chakras of the dog.

Generally, chakras are an important part of a dog's energy field. They are spinning energy portals or vortexes located in various locations throughout the body, and are a medium for the successful assimilation of vital life force energy. More specifically, life force energy filters in through a dog's chakras and then travels, by means of meridians into the endocrine system. It funnels out from there to reach every cell and fiber of the dog's being. When blockages and imbalances occur in a dog's chakras, this assimilation process is inhibited, thereby resulting in the manifestation of physical, emotional, mental or behavioral symptoms. One can heal chakras using crystals, color light therapy and many other healing modalities. Chakra healing through stones and crystals is a wonderful complement to veterinary care.

The pendant 120 with the crystal 130 can be open ended on each side or only open on one side so that the open end touches or faces the dog 140 directly and continuously. This is a very important and most desirable feature of the present invention. The crystal 130 is able to create a balance of positive energy between the dog 140 and the dog owner, and between the crystal 130 and the dog 140. Each crystal 130 works on different chakras. For example, Amethyst on Crown Chakra, Carnelian on Sacral Chakra, Yellow Jade on Solar Plexus, Green Aventurine and rose quartz on Heart Chakra, Lapis Lazuli on Throat Chakra, Clear Crystal on Third-eye Chakra, & Red jasper on Root Chakra. The present invention allows a user to interchange the crystal 130 as desired and attach different pendants 120 to the collar 110 in order to promote the desired positive energy associated with the particular crystal.

Further, the purpose of chakra balancing in a dog or other domesticated or undomesticated animal is to dissolve blockages before they become physical, although it can also be helpful with other physical conditions as well. Crystals 130, being symmetrical in their molecular structure, radiate energy in a consistent and steady manner. When they're used in chakra balancing, they can help to re-establish a healing and creative flow in a dog 140. By aligning and directing energy from crystals 130, owners can bring a dog's chakras back into balance.

Figure 3A:
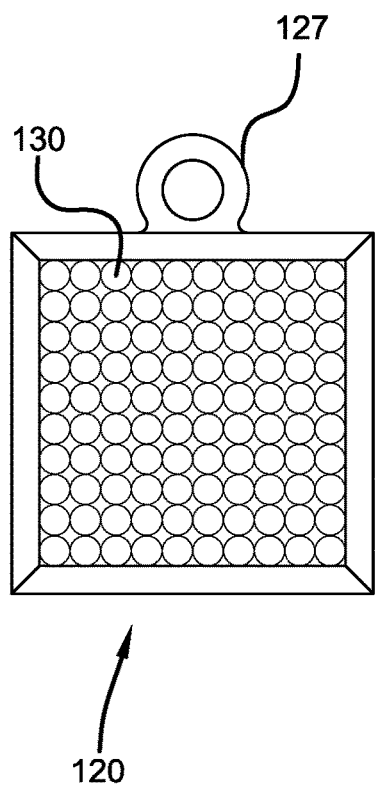
Figure 3B:
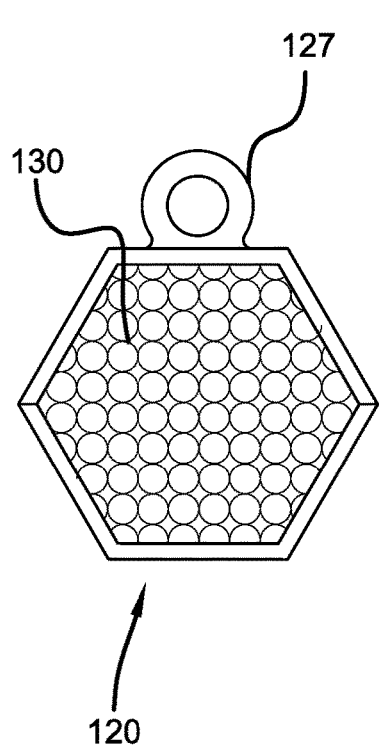
Figure 3C:
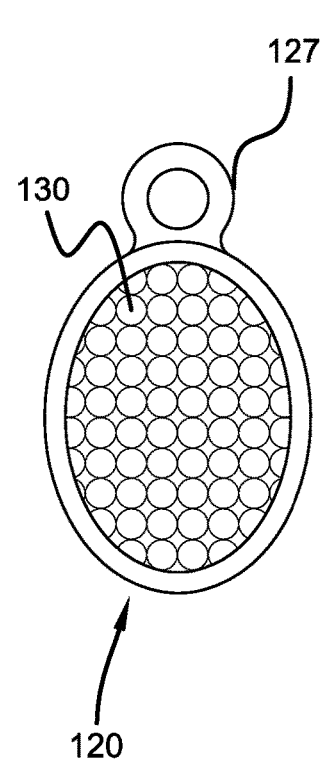

FIG. 3 illustrates different shapes of pendants 120 and crystals 130 of the present invention in accordance with the disclosed architecture. More specifically, as shown in FIG. 3, the crystal 130 and the pendant 120 can be of any suitable shape as shown such as square, oval, round, rectangular, hexagonal or other geometrical shape. FIG. 3(a) shows a square shaped pendant 120, FIG. 3(b) shows a hexagonal shaped pendant 120 and FIG. 3(c) an oval shaped pendant 120. However, other suitable shapes such as triangular, pentagon, star, circular, cross, animal etc. are also covered in the present invention. In addition, the gemstone or crystal may also be cut to form other shapes such as letters if the owner wants to further accessorize their pet. There are many symbols and shapes that are commonly used to create pendants 120. Many times these symbols are more than just pretty embellishments. For example, the meaning of an upward moving triangle is a symbol of aspiration or rising up, male force, and fire; the meaning of a downward pointing triangle is a symbol of water (as it flows downward), the grace of heaven, and the womb; the heart shape is a universal symbol for love, unity, compassion and affection.

The collar 110 of the present invention is a unique modified collar 110 in which a pendant 120 holding a crystal 130 can be attached. The pendant 120 will hold a crystal 130 or a precious stone or a gemstone and will be open on both ends to allow the crystal 130 and the energy of the crystal 130 to touch the dog 140. The collar 110 will assist in promoting positive energy between the dog owner and the dog 140, and also between the dog 140 and the crystal 130.

In a preferred embodiment of the present invention, a decorative collar 110 is provided, which consists of a piece of decorative material that can be fastened to the collar 110 by stitching. Each of the decorative material is provided with a snap fastening element and the piece of decorative material is provided with a plurality of complementary snap fastening elements thereon so that it can modify the overall appearance of the collar 110. Decorative materials can be artificial flowers, ribbons, glittering pieces and other similar products.

In an embodiment of the present invention, the collar 110 with the pendant 120 can be placed on any painful, tight, or misaligned area of pet's body to soothe pain and promote healing. The collar 110 has fastening mechanism that may help the collar 110 to be worn on anybody part. As an example, collar 110 with the pendant 120 containing lavender crystal 130 can be placed on a painful leg joint since lavender is particularly helpful for arthritis and painful joints. Alternatively, to increase the overall energy and vitality, the collar 110 with the pendant 120 containing lavender crystal 130 can be placed around the pet's neck.

A method of treating a physical or emotional condition of a pet, and includes steps of initially providing a collar 110. The collar has a pendant or ornament 120 removably detachable from the collar 110. Next, a crystal 130 is selected for use in treating a physical or emotional condition of the pet. The crystal 130 is inserted in the pendant 120 and the pendant is connected to the collar 110. The collar 110 is placed on the pet such that the crystal 130 is in one of direct or indirect contact with the pet, direct contact being physical while indirect being one of emissive or vibratory.

In an embodiment of the present invention, the collar 110 utilizes several location tracking means, most notably a cellular network tracking means, a back-up GPS tracking unit, and a plurality of light sources around the length of the collar 110 for visual tracking of the dog 140 in low-light environments. In another preferred embodiment, the collar 110 may have sensor elements that can be activated remotely to check vital signs of the dog 140 such as respiration, pulse, temperature, movement and positions and a processor that can interpret the results of multiple vital sign readings. The collar 110 may also have a two-way communication device attached or integrated thereto that can alert the pet owner, a veterinarian or the authorities, when appropriate, that the dog 140 is suffering from a particular condition or is exhibiting suspicious behavior or movements. The sensor elements that may be embedded in the collar 110 may gather data that can be processed on the collar 110 itself or transmitted to a remote terminal, such as a home computer, a hand-held device, or a main server computer, for processing. The collar 110 may also have reflective elements to improve visibility and promote safety of the animal.

Certain terms are used throughout the following description and claim to refer to particular features or components. As one skilled in the art will appreciate, different persons may refer to the same feature or component by different names. This document does not intend to distinguish between components or features that differ in name, but not structure or function. As used herein "crystal", "stone", "gemstone" and "gem" are interchangeable and refer to the crystal 130 of the present invention.

Notwithstanding the forgoing, the mindful dog life collar 100 of the present invention and its various structural components can be any suitable size, shape, and configuration as is known in the art without affecting the overall concept of the invention, provided that it accomplishes the above stated objectives. One of ordinary skill in the art will appreciate that the shape and size of the mindful dog life collar 100 and its various components, as shown in the FIGS. are for illustrative purposes only, and that many other shapes and sizes of the mindful pet life collar 100 are well within the scope of the present disclosure. The mindful pet life collar 100 and its components may be any shape or size that ensures optimal performance during use and/or that suits need and/or preference of pets and pet owners.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An accessory for a pet, comprising;
   a segment of material generally deformable and conforming to fit around a portion of the pet and forming one of a collar, a harness or a band, the segment of material comprising a RFID tag and a communication device;
   a detachable element containing a gemstone or crystal, the gemstone or crystal being selected to provide a health benefit to the pet, and the detachable element being removable from the segment of material, and the gemstone or crystal being removable from the detachable element; and
   the detachable element provides contact with the animal either directly or indirectly.

2. An accessory for a pet as recited in claim 1, wherein the crystal or gemstone is selected from the group including: carnelian, rose quartz, amethyst, selenite, aquamarine, yellow jade, green aventurine, lapis lazuli, clear crystals, red jasper and garnet.

3. An accessory for a pet as recited in claim 1, wherein the accessory is made from one of faux leather, nylon, natural fibers, synthetic fibers, metal, chain or combinations thereof.

4. An accessory for a pet as recited in claim 1, wherein the accessory is provided with a decorative pattern.

5. An accessory for a pet as recited in claim 1, wherein the detachable element is one of a pendant or an ornament.

6. An accessory for a pet as recited in claim 1, wherein the accessory is provided with a fastening clasp, a snap, a mechanical fastener or a combination thereof to secure the accessory to the portion of the pet.

7. An accessory for a pet as recited in claim 1, wherein the direct contact is a physical contact with the pet.

8. An accessory for a pet as recited in claim 1, wherein the indirect contact is a vibratory or an emissive contact with the pet.

9. An accessory for a pet as recited in claim 5, wherein the pendant or ornament has a front and a rear surface and at least partially encloses the gemstone or crystal.

10. An accessory for a pet as recited in claim 9, wherein one of the front and rear surfaces is sealed to protect the gemstone or crystal.

11. An accessory for a pet as recited in claim 9, wherein one of the front and rear surfaces is open in a direction facing the pet.

12. An accessory for a pet as recited in claim 1, wherein the detachable element rotates around a longitudinal axis of a fastener on the segment of the material.

13. An accessory for a pet as recited in claim 1, wherein the crystal or gemstone has a shape selected from a square, an oval, a round, a hexagonal, a rectangular, or other geometric shape.

14. An accessory for a pet as recited in claim 1, wherein the accessory further comprises a tracking device, a QR code, a reflective element, and a sensor.

15. A dog collar comprising;
   a collar having a dimension configured to fit around a neck of a dog, the collar comprising a fastening element to secure the collar to the dog, an electronic identification tag, a RFID tag, a sensor and a tracking device;
   a detachable pendant having front and rear surfaces and at least partially enclosing one of a crystal, a stone or a gemstone, the pendant having a shape corresponding to the shape of the crystal, the stone or the gemstone;
   the one of the crystal, the stone or the gemstone selected to correspond to a particular characteristic chosen by a user of the collar; and
   wherein the one of the crystal, the stone or the gemstone is held by the pendant so as to be in direct or indirect contact with the dog.

* * * * *